United States Patent [19]

Takemori

[11] 4,166,057
[45] Aug. 28, 1979

[54] POLY-4-METHYLPENTENE-1 COMPOSITION

[75] Inventor: Hayashi Takemori, Amagasaki, Japan

[73] Assignee: Dainichi-Nippon Cables, Ltd., Amagasaki, Japan

[21] Appl. No.: 922,140

[22] Filed: Jul. 5, 1978

[30] Foreign Application Priority Data

Jul. 5, 1977 [JP] Japan ................................ 52-80567

[51] Int. Cl.² .............................................. C08K 5/01
[52] U.S. Cl. ............................ 260/33.6 PQ; 525/240; 525/191
[58] Field of Search .................... 260/33.6 PQ, 896; 526/1

[56] References Cited

U.S. PATENT DOCUMENTS

| | | | |
|---|---|---|---|
| 3,591,536 | 7/1971 | Fukuma et al. | 260/33.6 PQ |
| 3,755,500 | 8/1973 | Clark | 260/896 |
| 4,046,945 | 9/1977 | Baxmann et al. | 260/33.6 PQ |

Primary Examiner—Lewis T. Jacobs
Attorney, Agent, or Firm—Sughrue, Rothwell, Mion, Zinn and Macpeak

[57] ABSTRACT

A composition comprising (a) poly-4-methylpentene-1 and (b) an olefin oligomer of the formula (I):

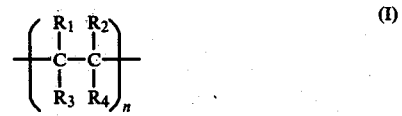

wherein $R_1$, $R_2$, $R_3$ and $R_4$, which may be the same or different, each is a hydrogen atom or an alkyl group having up to 18 carbon atoms, and n represents the degree of polymerization and is such that the oligomer has an average molecular weight of about 200 to about 5,000, with the oligomer being present in the composition in an amount of about 0.5 to about 30 parts by weight per 100 parts by weight of poly-4-methylpentene-1.

11 Claims, No Drawings

POLY-4-METHYLPENTENE-1 COMPOSITION

BACKGROUND OF THE INVENTION

1. Field of the Invention

This invention relates to a composition that contains poly-4-methylpentene-1 as the main component.

2. Description of the Prior Art

As a non-polar, high-melting crystalline polymer, poly-4-methylpentene-1 has excellent mechanical properties not only at normal temperature but at high temperatures as well, and has excellent dielectric properties over a wide range of temperatures and frequencies. Therefore, poly-4-methylpentene-1 is considered a promising material for use in various applications, especially as an electrical insulation material. However, one great disadvantage of this polymer is its poor flexibility, particularly at low temperatures.

Nowadays, there is an increasing need for flame-retardant electrical insulation materials. This need has made it important to develop technology for rendering poly-4-methylpentene-1, which is inflammable, an industrially applicable electrical insulation material. However, as far as the inventors of this invention known, none of the attempts at blending poly-4-methylpentene-1 with a conventional flame retardant to make the polymer flame-retardant have succeeded to date. This is because the low flexibility of the poly-4-methylpentene-1 becomes even lower as a result of the addition of the flame retardant. Due to these problems associated with poly-4-methylpentene-1, it has not yet become commercially available as a covering material for an electrical wire conductor.

U.S. Pat. No. 3,865,897 proposes improving the physical properties of poly-4-methylpentene-1 by blending it with a special polydiorganosiloxane gum. However, the physical properties, especially elongation, of the polymer obtained in this proposed method are not improved as much as needed. Secondly, the polydiorganosiloxane to be used is expensive. Thirdly, the method requires a separate step to achieve the blending.

SUMMARY OF THE INVENTION

One object of this invention is to provide a composition of poly-4-methylpentene-1 which can be prepared from an inexpensive material and which has appreciably improved physical properties such as flexibility and elongation.

Another object of this invention is to provide a flame-retardant poly-4-methylpentene-1 composition having excellent physical properties and processability.

Still another object of this invention is to provide a poly-4-methylpentene-1 composition or flame-retardant poly-4-methylpentene-1 composition which is easy to manufacture and has excellent flexibility and processability.

Accordingly, this invention provides in one embodiment a composition comprising (a) poly-4-methylpentene-1 and (b) an olefin oligomer of the formula (I):

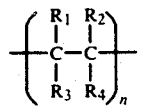

wherein $R_1$, $R_2$, $R_3$ and $R_4$, which may be the same or different, each is a hydrogen atom or an alkyl group having up to 18 carbon atoms, and n represents the degree of polymerization and is such that the oligomer has an average molecular weight of about 200 to about 5,000, with the oligomer being present in the composition in an amount of about 0.5 to about 30 parts by weight per 100 parts by weight of poly-4-methylpentene-1, and in another embodiment a composition comprising (a) poly-4-methylpentene-1, (b) the olefin oligomer described above and (c) at least one of a flame retardant, an antioxidant and a metal deactivator.

DETAILED DESCRIPTION OF THE INVENTION

The poly-4-methylpentene-1 to be used in this invention can be a homopolymer of 4-methylpentene-1 or a copolymer of 4-methylpentene-1 and at least one other monomer copolymerizable therewith, as described hereinafter. An example of such a polymer is a stereoregular, crystalline polymer having a melt index of 1 to 100, especially 5 to 80, as measured according to ASTM D 1238-70 (260° C., 5 kg load) and a density of about 0.82 to 0.85 g/cm³ at 23° C.

The poly-4-methylpentene-1 is prepared by homopolymerizing 4-methylpentene-1 or copolymerizing 4-methylpentene-1 with at least one other monomer copolymerizable therewith in the presence of a Ziegler catalyst, e.g., as disclosed in *Japan Plastics*, Vol. 16, No. 12, p87–90 (1965).

Examples of suitable monomers copolymerizable with 4-methylpentene-1 are straight chain or branched aliphatic hydrocarbon vinyl compounds having a total of 2 to 15 carbon atoms, such as ethylene, propylene, butene, pentene, hexene, octene, 3-methyl-butene-1, 3-methyl-pentene-1, 4-dimethylpentene-1 and 3-methyl-hexene-1; and aromatic hydrocarbon vinyl compounds having a total of 8 to 15 carbon atoms, such as styrene, o-divinyl benzene, m-divinyl benzene, p-divinyl benzene, p-vinyl toluene, and α-methyl styrene. One or more of these copolymerizable monomers may be used. The poly-4-methylpentene-1 to be used in this invention preferably contains at least about 60 wt % of 4-methylpentene-1. Poly-4-methylpentene-1 containing about 0.1 to about 20 wt % of one or more of the copolymerizable aromatic hydrocarbon vinyl compounds as illustrated above is also preferred. The olefin oligomer to be used in this invention has the formula (I):

wherein $R_1$, $R_2$, $R_3$ and $R_4$, which may be the same or different, each is a hydrogen atom or an alkyl group having up to 18 carbon atoms (e.g., straight chain and branched chain alkyl groups such as a hexyl group, a heptyl group, an octyl group, a nonyl group and a decyl group) and n represents the degree of polymerization and is such that the average molecular weight is in the range of about 200 to about 5,000.

More specifically, suitable oligomers of the formula (I) above which can be used are those prepared by oligomerizing one or more olefins having 2 to 20 carbon atoms, such as butene, α-octene, α-nonene, α-decene, α-undecene, α-dodecene and the like, in the presence of a Ziegler catalyst or a Friedel-Crafts catalyst, e.g., as disclosed in Oligomer Handbook, Junji Furukawa, Ed.

Kagaku Kogyo Nipposha, Tokyo (1977). Preferred olefin oligomers are those prepared by oligomerizing olefin monomers having 3 to 12 carbon atoms. Specifically, in this invention an oligomer of an α-olefin having 6 to 12, especially 8 to 12, carbon atoms, or polybutene, i.e. an oligomer comprising a mixture of butene isomers, is particularly preferred.

Since an olefin oligomer having an average molecular weight of less than 200 has high volatility and blooming easily occurs when such is mixed with poly-4-methylpentene-1, it is not very effective for modifying the physical properties of poly-4-methylpentene-1 in a stable manner over an extended period. On the other hand, an olefin oligomer having an average molecular weight in excess of about 5,000 does not have an appreciable effect in improving the physical properties, especially elongation and flexibility, of poly-4-methylpentene-1. The modifying effect of the oligomer becomes even lower upon addition of a flame retardant. Therefore, the preferred olefin oligomer has an average molecular weight in the range of about 300 to about 1,000, especially about 500 to about 700.

The olefin oligomer to be used in this invention may contain less than 10 wt % of aromatic moieties such as a benzene ring or a substituted benzene ring, or aliphatic moieties such as a cyclopentyl group, a substituted cyclopentyl group, a cyclohexyl group and a substituted cyclohexyl group. It may also contain a small amount of double bonds, but to have high oxidation stability, it preferably has a bromine value of 2 or less (as measured according to ASTM D 1159).

If the amount of the olefin oligomer used is too small, the ability of the olefin oligomer to modify the physical properties of poly-4-methylpentene-1 is reduced, and if it is used in an excessive amount, the olefin oligomer impairs the high dimension stability of poly-4-methylpentene-1. Therefore, the olefin oligomer can suitably be used in an amount of about 0.5 to about 30 parts, especially about 1 to about 20 parts, by weight per 100 parts by weight of poly-4-methylpentene-1.

The high dimension stability, flexibility and processability of the composition of this invention are retained and a flame retardant may be also incorporated therein.

Those inorganic or organic flame retardants which are commonly employed as flame retardants for rubber or plastics may be used in this invention; for example, (a) those which melt by themselves during combustion to form a film which cuts off the supply of oxygen and provides flame-retardancy; (b) those which evolve water vapor, carbon dioxide, ammonia and other non-flammable gases during combustion which cut off the supply of oxygen to provide flame-retardancy; (c) those which decompose or melt under burning conditions and remove heat of combustion so as to provide flame-retardancy.

Examples of suitable flame retardants which can be used are inorganic flame retardants such as antimony trioxide, antimony dioxide, molybdenum trioxide, zinc borate, aluminum hydroxide, zirconium silicate, ammonium bromide, ammonium phosphate, ammonium sulfate, ammonium chloride, and sodium bicarbonate; organic flame retardants, for example, phosphates such as tricresyl phosphate, cresyl phosphate, triphenyl phosphate, diphenyl octyl phosphate, tributyl phosphate, halogen-containing phosphates such as tris(β-chloroethyl)phosphate, tris(dichloropropyl)phosphate, tris(2,3-dibromopropyl)phosphate, tris(bromochloropropyl)phosphate, and halogen compounds such as perchloropentacyclodecane, decabromodiphenyl oxide, 2,2-bis(4-hydroxyethoxy-3,5-dibromophenyl)propane, decabromodiphenyl, pentabromotoluene, tetrabromobisphenol-A. Other flame retardants such as those described in *Handbook of Compounding Chemicals for Rubber and Plastics*, Tokihiko Motoyama, pp.326-338, Rubber Digest Publishing Company, Tokyo (1974), may also be used. Flame retardants preferred for use in this invention are those having a non-flamability parameter (NFP) of at least 22 as measured in the following flame retardancy test:

Flame Retardancy Test

The oxygen index of a composition having 50 parts by weight of a flame retardant to be tested uniformly blended with 100 parts by weight of polyethylene having a melt index of 1 to 10 and a density of 0.92 to 0.94 g/cm$^3$ is measured according to ASTM D 2863-70. The thus-measured oxygen index of the composition will be hereinafter referred to as the non-flamability parameter of the flame retardant to be tested.

If the composition of this invention is processed using a molding method which requires only a short time to accomplish such as press molding or injection molding, a flame retardant having a decomposition point lower than the processing temperature (about 220° C.) may be used, but if the composition is subjected to other kinds of molding such as extrusion molding that requires a relatively long time to accomplish, the flame retardant preferably has a boiling point or decomposition point higher than the processing temperature, especially higher than about 250° C.

Especially preferred flame retardants are organic flame retardants containing at least 5 wt % of phosphorus or at least 50 wt % of a halogen, for example, decabromodiphenyl oxide, tetrabromobisphenol-A, tetrabromobisphenol-S, etc.

In this invention, one or more flame retardants may be used, and a combination of inorganic flame retardants and organic flame retardants is especially preferred.

The flame retardant in this invention is used in an amount of about 5 to about 200 parts by weight, preferably from about 10 to about 100 parts by weight, per 100 parts by weight of poly-4-methylpentene-1.

The composition of this invention, either containing or not containing a flame retardant, may optionally also include a conventional amount of common compounding additives for rubbers or plastics, such as antioxidants, metal de-activators, colorants, UV absorbers, voltage stabilizers, carbon black, inorganic fillers, etc.

Suitable antioxidants which may be used in the present invention are those conventionally employed in the rubber and plastics industry. Among those, a preferred antioxidant is a hindered phenolic antioxidant which contains at least one hindered phenolic group in the molecule, and has a melting point or decomposition temperature higher than about 220° C., preferably higher than 250° C. Examples of the above antioxidants are 4,4'-butylidene bis(3-methyl-6-t-butyl phenol), tetrakis(methylene-3(3,5-di-t-butyl-4-hydroxy phenol)propionate]methane, 1,1,3-tris(2-methyl-4-hydroxy-5-t-butylphenyl)butane, 2,2'-methylene-bis(4-methyl-6-t-butylphenol), and hindered phenol phosphites which contain at least one hindered phenolic group and at least one phosphite group, such as hexamethylene-1,6-diol bis{4-[1-(4-hydroxy-3-t-butyl-6-methyl phenylbutyl)-2-methyl-5-t-butylphenyl]-4-n-octylphenyl}phosphite (hereinafter abbreviated as HMDOP). HMDOP or a combination of HMDOP and at least one of the other hindered phenolic antioxidants described above is most preferably employed in the composition of this invention, especially the composition of this invention containing a flame-retardant. The ratio of HMDOP to the other hindered phenolic antioxidant in the combination of antioxidants is about 0.5 to about 2 parts by weight of HMDOP per part by weight of the other hindered phenolic antioxidant.

A suitable amount of the antioxidant is about 0.05 to about 5 parts by weight, especially about 0.1 to about 3 parts by weight, per 100 parts by weight of the poly-4-methylpentene-1.

Suitable metal de-activators that can be used in this invention are those commonly used in rubber and plastics to prevent accelerated deterioration due to heavy metals, especially copper. A suitable metal de-activator for use in the composition of this invention that contains a flame retardant is 3-(N-benzoyl)amino-1,2,4-triazoles of the formula (II):

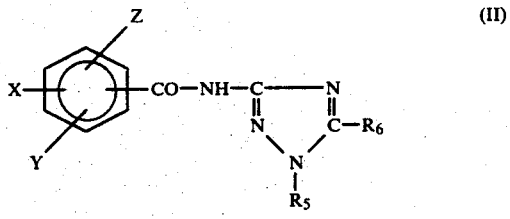

wherein X, Y, and Z, which may be the same or different, each is a hydrogen atom, a hydroxyl group, an alkoxy group, e.g., a methoxy group, an ethoxy group, etc., or an alkyl group, e.g., straight chain and branched chain alkyl groups such as an ethyl group, a methyl group, a propyl group, a butyl group, a t-octyl group, etc.; $R_5$ and $R_6$, which may be the same or different, each is a hydrogen atom, an aralkyl group, e.g., a (2,6-di-t-butyl-4-hydroxyphenyl)ethyl group, etc. or an alkoxycarboxyalkyl group, e.g., a methoxycarboxyethyl group, etc., each of these organic groups having 20 or less carbon atoms. Preferred examples are 3(N-salicyloyl)amino-1,2,4-triazole, 3(N-2-hydroxy-5-t-octyl-benzoyl)amino-1,2,4-triazole or 3(N-2-methoxybenzonyl)amino-1,2,4-triazole. A suitable amount of the metal de-activator to be used in this invention is about 0.05 to about 5 parts by weight per 100 parts by weight of the poly-4-methylpentene-1.

The composition of this invention comprising (a) poly-4-methylpentene-1 and (b) an olefin oligomer can be prepared by melt mixing, e.g., at about 240° to about 260° C., the two components in a roll mill or Banbury mixer which is conventionally employed in the rubber or plastics industry. Since the melting point of poly-4-methylpentene-1 is as high as 220° C., mixing is preferably performed with air supply shut off so as to prevent a deterioration of the two components during mixing.

In the preferred method of preparing the composition of this invention, pellets of poly-4-methylpentene-1 are mixed, e.g., at about 100° to about 200° C., preferably 150° to 200° C., with an olefin oligomer in a high speed mixer such as a Henschel mixer disclosed in U.S. Pat. No. 3,376,173 at a high speed, for example, with the peripheral speed of the rotating blades being at 40 to 100 m/sec. The great advantage of doing this is because the particles of the solid poly-4-methylpentene-1 are easily impregnated by the olefin oligomer and therefore, a composition in the form of a pellet can be prepared at a temperature lower than the melting point of poly-4-methylpentene-1 and within a short period of time, e.g., at about 20° to about 70° C. in about 30 to about 60 minutes. The thus-prepared composition of this invention in pellet form can be directly fed into an extruder to form an extrudate.

The composition of this invention which contains a flame retardant, an antioxidant, a metal deactivator, a filler or other compounding additives (hereunder these compounding additives will be referred to as "compounding additives" collectively) can be prepared by mixing the compounding additives with pellets of poly-4-methylpentene-1 impregnated with the olefin oligomer described above, or the compounding additives, poly-4-methylpentene-1 and olefin oligomer in a conventional mixer such as a roll mill, a Banbury mixer or a mixer-extruder at the melting point of the poly-4-methylpentene-1. Since the mixing temperature is high, mixing is preferably performed with the supply of air shut off so as to minimize oxidative deterioration of the components to be mixed. An example of a mixer capable of performing such mixing is a mixer-extruder. If the compounding additive to be incorporated has a lower melting point than poly-4-methylpentene-1, a high speed mixer such as a Henschel mixer is preferably used for allowing the additive to penetrate and mix with the pellets of poly-4-methylpentene-1.

If a compounding additive, especially a flame retardant which is used in a large amount, is solid at the mixing temperature, i.e., the melting point of poly-4-methylpentene-1, a relatively long time is required to disperse the additive practically uniformly throughout the poly-4-methylpentene-1. In such a case, it is advantageous to disperse the solid compounding additive uniformly in a specific polymeric material (which will be described hereinafter) prior to its addition to the poly-4-methylpentene-1. The so-treated compounding additive mixes with the poly-4-methylpentene-1 uniformly within a short period, thus preventing a thermal or oxidative deterioration of the two components that may occur during an extended mixing at high temperatures. This method is particularly effective for mixing a solid flame retardant with poly-4-methylpentene-1. A uniform mixture of a compounding additive with a polymeric material is prepared in the following manner.

A solid compounding additive is intimately and uniformly mixed, e.g., at about 80° to about 180° C., with a thermoplastic polymeric material having a lower melting point than poly-4-methylpentene-1 (specifically speaking, a melting point lower than about 200° C., particularly a melting point lower than 150° C.) under conditions where the polymeric materials melts and at the lowest possible temperature lower than about 200° C. The mixing can be achieved with a conventional mixer such as a roll mill, a Banbury mixer, etc. Subsequently, a mixture of olefinic oligomer and poly-4-methylpentene-1, for example, a mixture obtained by impregnating poly-4-methylpentene-1 with the olefin oligomer through high-speed mixing, is mixed with the mixture of the compounding additive and the polymeric material in a conventional mixer at a temperature above the melting point of the poly-4-methylpentene-1. By doing so, the solid compounding additive which has already been mixed intimately with the above polymeric material is dispersed easily and uniformly into the molten poly-4-methylpentene-1. Due to such high dispersibility, the solid mixture of poly-4-methylpentene-1 and olefin oligomer can be intimately and uniformly mixed with the solid mixture of the compounding additive and the polymeric material using the mixing effect achieved in a conventional extruder as they are merely extruded therefrom. As a result, an extrudate having a smooth surface is obtained.

Since the polymeric material described above is mixed with poly-4-methylpentene-1 at a temperature (about 220° to about 290° C., preferably about 240° to about 260° C.) higher than the melting point of the poly-4-methylpentene-1 and is to be eventually incorporated into the composition of this invention, the polymeric material must be stable at a temperature of at least about 220° C., preferably at least 250° C. The polymeric material must also have low-temperature flexibility that it does not impair the flexibility of the composition of this invention at normal temperature (e.g., about 10°–30° C.); more specifically, the polymeric material should have a brittleness temperature lower than normal temperature, preferably, lower than 0° C. Polymers of any chemical structure can be used as long as they satisfy the conditions described above, but hydrocarbons which are capable of being mixed with poly-4-methylpentene-1 more uniformly and in a shorter period than others are preferred. Those hydrocarbons which have a melt viscosity substantially the same as that of the poly-4-methylpentene-1 under mixing, in other words, a melt index of about 1 to 100, especially 5 to 80, as measured according to ASTM D 1238-70 (260° C., 5 kg load), are preferred. Preferred examples of suitable polymeric materials include polyethylene, polypropylene, copolymers of ethylene such as ethylene-propylene copolymers, ethylene-propylene-diene copolymers, ethylene-butene copolymers, ethylene-vinyl acetate copolymers, ethylene-ethylacrylate copolymers, etc.

The mixing ratio of the compounding additive to the polymeric material is about 1500 parts by weight or less of the compounding additive per 100 parts by weight of the polymeric material with the polymeric material as eventually incorporated in the composition of this invention being about 30 parts by weight or less, preferably about 15 parts by weight or less, per 100 parts by weight of poly-4-methylpentene-1. If more than about 30 parts by weight of the polymeric material is used, such adversely affects the excellent dimensional stability of poly-4-methylpentene-1. To facilitate the mixing of the polymeric material with the compounding additive and to prepare a uniform dispersion of the compounding additive in the polymeric material, about 200 to about 800 parts by weight of the compounding additive per 100 parts by weight of the polymeric material is preferred.

To prepare the composition of this invention using a polymeric material, all of the olefin oligomer to be used may be mixed, e.g., at about 80° to about 180° C., preferably about 100° to about 140° C., with a compounding additive and a polymeric material, and the mixture thus-obtained of these three components may then be mixed with the poly-4-methylpentene-1. Alternatively, the oligomer may be divided into two portions, one of which is mixed with the poly-4-methylpentene-1 and the other of which is mixed with the mixture of the compounding additive and the polymeric material. Either method can be used to achieve the same results as in the method described above wherein all of the olefin oligomer is first mixed with the poly-4-methylpentene-1.

The composition of this invention comprising the poly-4-methylpentene-1 and olefin oligomer has various advantages. Some of these advantages are set forth specifically below.

(1) The composition of this invention can easily be produced using a conventional mixing means such as a mixing-extruder. Use of a high speed mixer such as a Henschel mixer which avoids melting of poly-4-methylpentene-1 simplifies the processing. The high speed mixer also provides a product of high quality because mixing at low temperatures can be achieved and thus oxidative deterioration does not occur.

(2) The composition of this invention retains the excellent dimensional stability of poly-4-methylpentene-1. In addition, the composition has sufficient flexibility not only at normal temperature but also at a temperature below 0° C. as well thus allowing the composition of this invention to be used as an electric insulation material.

(3) Generally speaking, a low-molecular material mixed with a high-molecular material often blooms on the surface, but the degree of blooming by the olefin oligomer used in the composition of this invention is extremely small. This is unexpected and industrially advantageous.

(4) Poly-4-methylpentene-1 is flammable and has relatively low resistance to ageing and heavy metal attack.

These defects of poly-4-methylpentene-1 can be eliminated from the composition of this invention which allows incorporation of a corrective compounding agent, especially a flame retardant. The composition of this invention containing a compounding additive is free from the defects of poly-4-methylpentene-1 and yet retains the excellent dimensional stability of the same. If the compounding additive is a flame retardant, the long range stability and flexibility of the composition at low temperatures (e.g., about 10°–30° C.) is unexpectedly improved over the case where no flame retardant additive is used.

The composition of this invention retains the excellent dimensional stability of the poly-4-methylpentene-1 and yet has high flexibility at low temperatures. Thus, the composition of this invention is useful as a variety of molding materials. Due to the excellent dielectric properties of the composition of this invention, it can also be advantageously used as an insulation material for electric wires.

The composition of this invention containing a flame retardant is a flame-retardant composition having good mechanical properties in the range of from normal temperature to high temperature and has excellent low-temperature flexibility. Hence, the composition is useful as an insulation material for electric wires, interior or exterior trimming materials for buildings, or materials for flame-retardant pipes, sheets or tapes.

The advantageous effects of this invention will be described in greater detail by reference to the following examples and comparative examples. Unless otherwise specified, all proportions of the components in the composition are parts by weight.

EXAMPLES 1 to 17

Comparative Examples 1 to 4

Examples of compositions of this invention and comparative examples of compositions were prepared as described below.

Each of the compositions set forth in Table 1 below was mixed in a 5 liter-Henschel mixer at an impeller speed of 2,000 rpm for 30 minutes, with the temperature of the mixing bath controlled at 150° to 200° C. The thus-obtained mixture in pellet form was charged into a Brabender extruder having a bore of 20 mm and L/D of 20, where the mixture was mixed and extruded at 250°±10° C. to obtain 0.5 mm thick sheets. In each example, a laminate formed of a plurality of the thus-prepared sheets was press molded at 250° C. under 100 kg/cm².G for 10 minutes. The impact brittleness temperature, elongation at break at 5° C., and the oxygen index of the molded laminate were measured according to JIS K 6760 5.4, JIS K 6301 and ASTM D 2863-70, respectively. In Comparative Example 1 and Examples 12, 14 and 16, the press molded laminate was cut into strips of a size of about 15 mm × 100 mm. A copper plate of a thickness of 0.5 mm, a width of 13 mm and a length of 90 mm (cleaned according to ASTM D 1934-68, 5.3) was sandwiched between two of the strips. The copperplate sandwiching strips were sandwiched with two clean glass plate of a thickness of 2 mm, a width of 16 mm and a length of 100 m, clipped at both ends, left standing for 4 days in a circulation air constant temperature bath regulated at 180° C., and the elongation at break after ageing was measured at 5° C. Further, some of the press molded laminates of Comparative Example 1 and Examples 1, 2, 3, 5, 7, 8, 12, 13, 14 and 16 were left standing at room temperature (about 15°–30° C.) for about 6 months and their impact brittleness temperature after standing at room temperature was measured.

The results obtained are set forth in Table 2 below. Table 2 also shows the characteristics of the composition obtained in Comparative Examples 1 to 4. The composition prepared according to Comparative Example 4 was so fragile that its properties were impossible to evaluate.

Table 1

| | | Comparative Example | | | | Example | | | | | | | | | | | | | | | | | | |
|---|---|---|---|---|---|---|---|---|---|---|---|---|---|---|---|---|---|---|---|---|---|---|---|---|
| | | 1 | 2 | 3 | 4 | 1 | 2 | 3 | 4 | 5 | 6 | 7 | 8 | 9 | 10 | 11 | 12 | 13 | 14 | 15 | 16 | 17 | 18 | 19 | 20 |
| Poly-4-methyl-pentene-1 | A | 100 | — | — | 100 | — | 100 | 100 | 100 | 100 | 100 | 100 | 100 | 100 | 100 | 100 | 100 | 100 | 100 | 100 | 100 | — | 100 | 100 | 100 |
| | B | — | 100 | — | — | 100 | — | — | — | — | — | — | — | — | — | — | — | — | — | — | — | 100 | — | — | — |
| | C | — | — | 100 | — | — | — | — | — | — | — | — | — | — | — | — | — | — | — | — | — | — | — | — | — |
| Olefin Oligomer | A | — | — | — | — | 10 | — | — | — | — | — | — | — | — | — | — | — | 10 | — | — | 5 | 5 | 5 | 5 | 5 |
| | B | — | — | — | — | — | 5 | — | — | — | — | — | — | — | — | 10 | — | — | — | — | — | — | — | — | — |
| | C | — | — | — | — | — | — | 5 | — | — | — | — | — | — | 5 | — | — | — | — | — | — | — | — | — | — |
| | D | — | — | — | — | — | — | — | 10 | — | — | — | — | — | — | — | — | — | — | — | — | — | — | — | — |
| | E | — | — | — | — | — | — | — | — | 15 | — | — | — | — | — | — | — | — | — | — | — | — | — | — | — |
| | F | — | — | — | — | — | — | — | — | — | 10 | — | — | — | — | — | — | — | — | — | 10 | — | — | — | — |
| | G | — | — | — | — | — | — | — | — | — | — | 10 | — | — | — | — | — | — | — | 10 | — | — | — | — | — |
| | H | — | — | — | — | — | — | — | — | — | — | — | 5 | — | — | 5 | — | — | — | — | — | — | — | — | — |
| | I | — | — | — | — | — | — | — | — | — | — | — | — | 10 | — | — | — | — | — | — | — | — | — | — | — |
| Decabromodiphenyl Oxide | | — | — | — | 50 | — | — | — | — | — | — | — | — | — | 50 | 50 | 50 | 50 | 50 | 50 | 50 | — | 50 | 50 | 50 |
| Tetrabromobisphenol - A | | — | — | — | — | — | — | — | — | — | — | — | — | — | — | — | — | — | — | — | — | 50 | — | — | — |
| Antimony trioxide | | — | — | — | — | — | — | — | — | — | — | — | — | — | 10 | 10 | 10 | 10 | 10 | 10 | 10 | 10 | 10 | 10 | 10 |
| Antioxidant | A | — | — | — | — | — | — | — | — | — | — | — | — | — | 0.5 | 0.5 | 0.5 | 0.5 | 0.5 | 0.5 | 0.5 | 1.0 | 0.5 | — | 1.0 | 1.0 |
| | B | — | — | — | — | — | — | — | — | — | — | — | — | — | — | — | — | — | — | — | — | — | — | 1.0 | — | — |
| | C | — | — | — | — | — | — | — | — | — | — | — | — | — | — | — | — | — | — | — | — | 0.5 | — | 0.5 | — | — |
| | D | — | — | — | — | — | — | — | — | — | — | — | — | — | — | — | — | — | — | — | — | — | — | — | 0.5 | 0.5 |
| Metal Deactivator | | — | — | — | — | — | — | — | — | — | — | — | — | — | — | — | — | — | — | — | — | 1.0 | — | 1.0 | 1.0 | 1.0 |
| Polymeric Material | A | — | — | — | — | — | — | — | — | — | — | — | — | — | — | — | — | — | — | — | — | — | — | 10 | — | — |
| | B | — | — | — | — | — | — | — | — | — | — | — | — | — | — | — | — | — | — | — | — | — | — | — | 10 | — |
| | C | — | — | — | — | — | — | — | — | — | — | — | — | — | — | — | — | — | — | — | — | — | — | — | — | 8 |

Table 2

| Comparative Example | Impact Brittleness Temperature (°C.) | Elongation at Break (%) | Oxygen Index | Elongation at Break after Ageing (%) | Impact Brittleness Temperature after Standing at Room Temperature (°C.) |
|---|---|---|---|---|---|
| 1 | +18 | 40 | 13 | Cruck | +18 |
| 2 | +32 | — | 13 | — | — |
| 3 | +14 | 60 | 13 | — | — |
| 4 | — | — | — | — | — |

Example

Table 2-continued

| Comparative Example | Impact Brittleness Temperature (°C.) | Elongation at Break (%) | Oxygen Index | Elongation at Break after Ageing (%) | Impact Brittleness Temperature after Standing at Room Temperature (°C.) |
|---|---|---|---|---|---|
| 1 | −13 | 380 | — | — | −9 |
| 2 | −8 | 300 | — | — | −8 |
| 3 | −3 | 196 | — | — | −1 |
| 4 | +1 | 110 | — | — | — |
| 5 | +3 | 100 | — | — | +4 |
| 6 | −13 | 380 | — | — | — |
| 7 | −12 | 360 | — | — | −10 |
| 8 | −6 | 249 | — | — | −3 |
| 9 | +2 | 100 | — | — | — |
| 10 | +5 | 153 | 27.0 | — | — |
| 11 | +1 | 205 | 27.0 | — | — |
| 12 | −5 | 250 | 26.5 | 150 | −5 |
| 13 | −6 | 260 | 27.0 | — | −6 |
| 14 | −5 | 240 | 27.0 | 130 | −5 |
| 15 | −6 | 250 | 27.5 | — | — |
| 16 | −4 | 200 | 27.0 | 180 | −5 |
| 17 | −3 | 210 | 27.0 | — | — |

The symbol "—" indicates no evaluation was made.

Poly-4-Methylpentene-1

A. Poly-4-methylpentene-1 (a product of Mitsui Petrochemical Industries, Ltd.; average particle size: 3 to 5 mm; melt index (260° C., 5 kg load): 26 g/10 min.; density (23° C.): 0.840 g/cm$^3$; infrared characteristic absorption bands at 720 cm$^{-1}$, 790, 849, 870, 917, 993, 1127, 1195, 1230, 1269, 1363, 1437 and 1740).

B. Poly-4-methylpentene-1 (TPX RT-20, tradename for a product of I.C.I. England; average particle size: 3 to 5 mm; melt index (260° C., 5 kg load): 26 g/10 min.; density (23° C.): 0.830 g/cm$^3$; infrared characteristic absorption bands at 790 cm$^{-1}$, 849, 870, 917, 993, 1127, 1195, 1230, 1269, 1363 and 1437).

C. Poly-4-methylpentene-1 (a product of Mitsui Petrochemical Industries, Ltd.; average particle size: 3 to 5 mm; a melt index (260° C., 5 kg load): 12 g/10 min.; density (23° C.): 0.840 g/cm$^3$; infrared characteristic absorption bands at 720 cm$^{-1}$, 790, 849, 870, 917, 993, 1127, 1195, 1230, 1269, 1363, 1437, and 1740).

Alpha-Olefin Oligomer

A to E are alpha olefin oligomers, product of Lion Fat & Oil Co., having the formula:

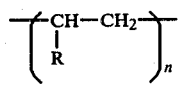

wherein R is an alkyl group having 8 carbon atoms on the average. The tradename, average molecular weight (MW) and bromine value (Br Value, Unit: gBr$_2$/100 g) of each oligomer are as follows:

A Lipolube 40, MW=570 and Br Value=0.5
B Lipolube 70, MW=660 and Br Value=0.4
C Lipolube 200, MW=835 and Br Value=0.4
D Lipolube 500, MW=1650 and Br Value=2.5
E Lipolube 2000, MW=2200 and Br Value=1.5
F to I were polybutene, products of Nichiyu Chemical Co., Ltd. or Nippon Petrochemical Co., Ltd., each comprising a polymer of a mixture of butene isomers, whose main component is an isobutene of the following formula:

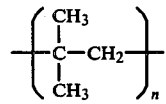

The tradename, average molecular weight (MW) and the bromine value (Br Value, Unit: gBr$_2$/100 g) of each product are as follows:

F Newgride U (Nichiyu Chemical Co., Ltd.), MW=510 and Br Value=0.5
G Polyvis 015SH (Nichiyu Chemical Co., Ltd.), MW=580 and Br Value=1.0
H HV-15E (Nippon Petrochemical Co., Ltd.), MW=630 and Br Value=30
I Polyvis 30N (Nichiyu Chemical Co., Ltd.) MW=1350 and Br Value=8.0

Antioxidants

A tetrakis[Methylene-3(3,5-di-t-butyl-4-hydroxyphenyl)propionate]methane
B 4,4'-Butylidene-bis(3-methyl-6-t-butylphenol)
C Dilauryl Thiodipropionate
D HMDOP (tradename "Mark NHP-H", a product of Adeka Argus Chemical Co., Ltd.)

Metal Deactivator

3(N-Salicyloyl)amino-1,2,4-triazole.

Polymeric Material

A Ethylene/butene-1 Copolymer ("Toughmer A-20090", a product of Mitsui Petrochemical Industries, Ltd., melt index (190° C., 2.6 kg load): 20 g/10 min.; density (23° C.): 0.89 g/cm$^3$).
B Low Density Polyethylene ("Yukalon LM-40", a product of Mitsubishi Petrochemical Co., Ltd.; melt index (190° C., 2.6 kg load): 10 g/10 min.; density (23° C.): 0.923 g/cm$^3$).
C Ethylene/Propylene Copolymer ("EP-07P", a product of Mitsubishi Petrochemical Co., Ltd.; Mooney viscosity (ML$_{1+4}$ 100° C.): 70; density (23° C.): 0.865 g/cm$^3$).

EXAMPLES 18 TO 20

The polymeric materials as set forth in Table 1 above were intimately blended with the flame retardants, antioxidants and metal deactivator (also set forth in Table 1 above) for about 20 minutes in the proportions specified in Table 1 in a roll mill whose temperature was controlled at 120° C. The sheets obtained were formed into 2–5 mm pellets. These pellets and the pellets prepared in Example 2 with a Henschel mixer were mixed at a predetermined ratio in a Brabender extruder of the same type described above (temperature: 250±approx. 10° C.), from which the mixture was extruded in the form of sheets of a thickness of 0.5 mm. The thus formed sheets were press molded in entirely the same manner as employed in Example 1 and the other examples. Their impact brittleness temperature, elongation at break and oxygen index were measured. The results of these measurements are shown in Table 3 below. The extrudate obtained in each of Examples 18 to 20 had a smooth surface.

Table 3

| Example No. | Impact Brittleness Temperature (°C.) | Elongation at Break (%) | Oxygen Index |
|---|---|---|---|
| 18 | −5 | 220 | 26.0 |
| 19 | −6 | 250 | 25.5 |
| 20 | −5 | 230 | 25.0 |

While the invention has been described in detail and with reference to specific embodiments thereof, it will be apparent to one skilled in the art that various changes and modifications can be made therein without departing from the spirit and scope thereof.

What is claimed is:

1. A composition comprising (a) poly-4-methylpentene-1 and (b) an olefin oligomer of the formula (I):

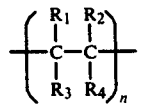

(I)

wherein R$_1$, R$_2$, R$_3$ and R$_4$, which may be the same or different, each is a hydrogen atom or an alkyl group having up to 18 carbon atoms, and n represents the degree of polymerization and is such that the oligomer has an average molecular weight of about 200 to about 5,000, said oligomer being present in said composition in an amount of about 0.5 to about 30 parts by weight per 100 parts by weight of poly-4-methylpentene-1.

2. The composition of claim 1, wherein said olefin oligomer is an α-olefin oligomer or a polybutene.

3. The composition of claim 1 or 2, wherein said olefin oligomer has a bromine value of 2 or less.

4. The composition of claim 1 or 2, wherein said olefin oligomer has an average molecular weight of 300 to 1,000.

5. The composition of claim 1 or 2, further including a flame retardant having a non-flamability parameter of at least 22 as measured by the oxygen index of a composition comprising 50 parts by weight of the flame retardant and 100 parts by weight of polyethylene having a melt index of 1 to 10 and a density of 0.72 to 0.94 g/cm$^2$ according to ASTM D 2863-70, with the flame retardant being present in an amount of about 5 to 200 parts by weight per 100 parts by weight of said poly-4-methylpentene-1.

6. The composition of claim 5, wherein said flame retardant is a mixture of a solid flame retardant and a polymeric material having a melting point or softening point lower than about 200° C., with said solid flame retardant being well dispersed in said polymeric material.

7. The composition of claim 6, wherein said flame retardant is decabromodiphenyl oxide.

8. The composition of claim 1 or 2, further including a hindered phenolic antioxidant containing at least one hindered phenolic group in the molecule and having a melting point or decomposition temperature higher than about 220° C., said antioxidant being present in an amount of about 0.05 to about 5 parts by weight per 100 parts by weight of the poly-4-methylpentene-1.

9. The composition of claim 8, wherein said hindered phenolic antioxidant is hexamethylene-1,6-diol bis{4-[1-hydroxy-3-t-butyl-6-methylphenylbutyl)-2-methyl-5-t-butylphenyl]-4-n-octylphenol}phosphite or a combination of hexamethylene-1,6-diol bis{4-[1-(4-hydroxy-3-t-butyl-6-methylphenylbutyl)-2-methyl-5-t-butylphenol]-4-n-octylphenol}phosphite and at least one other hindered phenolic antioxidant.

10. The composition of claim 1 or 2, further including a 3(N-benzoyl)amino-1,2,4-triazole in an amount of about 0.05 to about 5 parts by weight per 100 parts by weight of poly-4-methylpentene-1.

11. The composition of claim 10, wherein said 3(N-benzoyl)amino-1,2,4-triazole is 3(N-salicyloyl)amino-1,2,4-triazole.

* * * * *